US010557525B2

(12) United States Patent
Chen et al.

(10) Patent No.: US 10,557,525 B2
(45) Date of Patent: Feb. 11, 2020

(54) COAXIAL OUTPUT MOTOR

(71) Applicant: GEYUAN POWER CO., LTD., Wuhan (CN)

(72) Inventors: Zhe Chen, Wuhan (CN); Jiandong Wang, Wuhan (CN)

(73) Assignee: GEYUAN POWER CO., LTD., Wuhan (CN)

( * ) Notice: Subject to any disclaimer, the term of this patent is extended or adjusted under 35 U.S.C. 154(b) by 235 days.

(21) Appl. No.: 15/076,693

(22) Filed: Mar. 22, 2016

(65) Prior Publication Data

US 2016/0201762 A1   Jul. 14, 2016

Related U.S. Application Data

(63) Continuation-in-part of application No. PCT/CN2014/086817, filed on Sep. 18, 2014.

(30) Foreign Application Priority Data

Sep. 22, 2013  (CN) .......................... 2013 1 0431688
Sep. 22, 2013  (CN) ..................... 2013 2 0585115 U (51) Int. Cl.
*F16H 3/091*   (2006.01)
*F16H 57/02*   (2012.01)
(Continued)

(52) U.S. Cl.
CPC ............. *F16H 3/0915* (2013.01); *B60K 1/00* (2013.01); *B60K 7/0007* (2013.01); *F16H 57/02* (2013.01);
(Continued)

(58) Field of Classification Search
CPC .......... H02K 7/00; H02K 7/0006; H02K 7/08; H02K 7/083; H02K 7/10; H02K 7/116;
(Continued)

(56) References Cited

U.S. PATENT DOCUMENTS 5,832,789 A * 11/1998 Kinto ...................... F16H 57/02
                                                             74/606 R
7,982,346 B2 *  7/2011 Mogi ...................... B60K 17/12
                                                             180/65.6
(Continued)

FOREIGN PATENT DOCUMENTS

CN         102616134 A  *  8/2012

OTHER PUBLICATIONS

Schaeffler. Design of bearing arrangements. Nov. 25, 2012. Apr. 13, 2018. <https://web.archive.org/web/20121125212417/http://medias.ina.com/medias/en!hp.tg.cat/tg_hr*ST4_1652155275>. (Year: 2012).*

*Primary Examiner* — William Kelleher
*Assistant Examiner* — Joseph Brown
(74) *Attorney, Agent, or Firm* — Matthias Scholl P.C.; Matthias Scholl (57) ABSTRACT

A coaxial output motor, including a motor subassembly, a transmission mechanism, and a gear shift mechanism. The motor subassembly includes a motor housing, a rear cover disposed on one end of the motor housing, a front cover disposed on another end of the motor housing, and a rotor shaft movably disposed on the rear cover and the front cover. The rotor shaft is a hollow structure. The transmission mechanism includes an input gear fixedly disposed on a front end of the rotor shaft and a first countershaft gear movably disposed on the front cover. The gear shift mechanism includes a first speed change gear. The first speed change gear is movably disposed on the tip of the front end of the rotor shaft. The input gear is connected to the first speed change gear via the first countershaft gear.

3 Claims, 5 Drawing Sheets

(51) Int. Cl.
*H02K 7/116* (2006.01)
*B60K 1/00* (2006.01)
*H02K 7/10* (2006.01)
*H02K 7/08* (2006.01)
*B60K 7/00* (2006.01)
*H02K 7/00* (2006.01)
*F16H 37/04* (2006.01)

(52) U.S. Cl.
CPC .............. *H02K 7/006* (2013.01); *H02K 7/083* (2013.01); *H02K 7/10* (2013.01); *H02K 7/116* (2013.01); *B60K 2001/001* (2013.01); *F16H 37/041* (2013.01); *F16H 2057/02034* (2013.01); *F16H 2200/0021* (2013.01)

(58) Field of Classification Search
CPC ......... H02K 7/0007; H02K 2007/0092; B60K 1/00; B60K 2001/001; B60K 2007/0092; F16H 2057/02034; F16H 57/02
USPC .............. 74/421 A; 310/75 R, 83; 180/65.1, 180/65.51, 65.6, 65.7
See application file for complete search history.

(56) References Cited

U.S. PATENT DOCUMENTS

| | | | | |
|---|---|---|---|---|
| 8,556,760 B2* | 10/2013 | Mack | ........................ | B60K 1/00 475/152 |
| 2003/0232678 A1* | 12/2003 | Yamauchi | .............. | B60K 6/365 475/5 |
| 2004/0110592 A1* | 6/2004 | Yamauchi | .............. | B60K 6/365 475/5 |
| 2005/0077802 A1* | 4/2005 | Toujima | ................. | H02K 16/02 310/266 |
| 2005/0101425 A1* | 5/2005 | Yamauchi | .............. | B60K 6/365 475/5 |
| 2009/0211824 A1* | 8/2009 | Knoblauch | ............. | B60K 1/00 180/65.7 |
| 2010/0320849 A1* | 12/2010 | Wilton | ..................... | B60K 1/00 310/52 |
| 2011/0094806 A1* | 4/2011 | Mack | ..................... | B60L 50/16 180/65.6 |
| 2011/0298314 A1* | 12/2011 | Atarashi | ................ | B60K 6/405 310/54 |
| 2013/0220718 A1* | 8/2013 | Gotou | ..................... | B60K 1/00 180/65.6 |

* cited by examiner

COAXIAL OUTPUT MOTOR

CROSS-REFERENCE TO RELATED APPLICATIONS

This application is a continuation-in-part of International Patent Application No. PCT/CN2014/086817 with an international filing date of Sep. 18, 2014, designating the United States, now pending, and further claims priority benefits to Chinese Patent Application No. 201310431688.4 filed Sep. 22, 2013 and to Chinese Patent Application No. 201320585115.2 filed Sep. 22, 2013. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The invention relates to a coaxial output motor.

Description of the Related Art

Conventional driving mechanisms used in electric vehicles have the following disadvantages. 1) The chassis occupies much space which decreases the duty ratio of the batteries and shortens the driving distance per charge. 2) The driving mechanisms involve a plurality of coupling members and are complex to install, which increases operational costs. In addition, the balance performance of the electric vehicles is poor when conventional driving mechanisms are used.

SUMMARY OF THE INVENTION

In view of the above-described problems, it is one objective of the invention to provide a coaxial output motor. The motor comprises a driving assembly capable of coaxial output from both ends.

To achieve the above objective, in accordance with one embodiment of the invention, there is provided a coaxial output motor, comprising a motor subassembly, a transmission mechanism, and a gear shift mechanism. The motor subassembly comprises a motor housing, a rear cover disposed on one end of the motor housing, a front cover disposed on another end of the motor housing, and a rotor shaft movably disposed on the rear cover and the front cover. The rotor shaft is a hollow structure. The transmission mechanism comprises an input gear fixedly disposed on a front end of the rotor shaft and a first countershaft gear movably disposed on the front cover. The gear shift mechanism comprises a first speed change gear. The first speed change gear is movably disposed on a tip of the front end of the rotor shaft. The input gear is connected to the first speed change gear via the first countershaft gear so that during operation, rotation of the input gear is transmitted to the first speed change gear via the countershaft gear. Because the rotor shaft is a hollow structure, on the one hand, power of the motor subassembly is output from one end of the rotor shaft; on the other hand, the power of the motor subassembly is output from another end of the rotor shaft via a transmission shaft disposed inside the rotor shaft. The power outputs are smoother, and are on the same axial line. Meanwhile, the transmission mechanism and the gear shift mechanism are integrated on the front cover, thus the motor features compact structure, and the size of the whole drive assembly is thereby reduced.

In a class of this embodiment, the first speed change gear is an internal-external dual gear structure. One end of the first speed change gear is movably disposed on the tip of the front end of the rotor shaft; the input gear is connected to a ring gear of the first speed change gear via the first countershaft gear so that during operation, the rotation of the input gear is transmitted to the ring gear of the first speed change gear via the first countershaft gear.

In a class of this embodiment, the first speed change gear is disposed on the tip of the front end of the rotor shaft via a coaxial locating bearing.

In a class of this embodiment, one side surface of the coaxial locating bearing closely butts against an end surface of the input gear. Another side surface of the coaxial locating bearing is provided with a spacer sleeve and a retaining ring. The retaining ring is disposed in a shaft hole of the first speed change gear. The spacer sleeve is disposed on one side of the retaining ring.

In a class of this embodiment, the first countershaft gear is at least one in number.

In a class of this embodiment, the first countershaft gear is a dual gear structure. One end of the first countershaft gear is constantly meshed with the input gear, and another end of the first countershaft gear is constantly meshed with the first speed change gear.

In a class of this embodiment, internal and external connecting surfaces of the rear cover and the front cover each are provided with spigots comprising built-in static seal assemblies.

In a class of this embodiment, a joint of the rotor shaft and the rear cover, and a joint of the rotor shaft and the front cover are provided with rotary seal assemblies, respectively.

Because the rotor shaft is a hollow structure, the power of the motor subassembly can be output both from one end of the rotor shaft and from another end of the rotor shaft via a transmission shaft disposed inside the rotor shaft. The power outputs are smoother, and are on the same axial line. In addition, the transmission mechanism and the gear shift mechanism are integrated on the front cover, thus the motor features compact structure, and the size of the whole drive assembly is thereby reduced.

Advantages of the motor according to embodiments of the invention are summarized as follows: the motor features good dynamic balance, compact structure, and small occupation of chassis, which is beneficial to the arrangement of chassis in vehicles.

BRIEF DESCRIPTION OF THE DRAWINGS

The invention is described hereinbelow with reference to the accompanying drawings, in which.

In the drawings, the following reference numbers are used: 1. Motor subassembly; 1a. Motor housing; 1b. Rotor shaft; 1c. Rear cover; 1d. Front cover; 1e. Spigots; 1f. Rotary seal assemblies; 2. Torque converter subassembly; 2a. Torque converter housing; 2b. Gear shift mechanism; 2b1. First speed change gear; 2b2. Second countershaft gear; 2b3. Second speed change gear; 2b4. Coaxial locating bearing; 2b5. Coaxial suspension bearing of differential; 2b6. Spacer sleeve; 2b7. Retaining ring; 2c. Torque converter cover; 3. Differential subassembly; 4. Transmission mechanism; 4a. Input gear; 4b. First countershaft gear; 5. Coaxial transmission shaft; 5a. Transmission shaft sleeve; 6. External axle housing; 6a. External spigot; 7. Axle tube; 8. Hub subassembly of first external brake; 8a. Axle shaft; 9. Protection shell of external transmission; 10. Hub subassembly of second external brake; 10a. Constant speed transmission shaft; and 11. Suspension subassembly.

DETAILED DESCRIPTION OF THE EMBODIMENTS

For further illustrating the invention, experiments detailing a coaxial output motor are described below. It should be noted that the following examples are intended to describe and not to limit the invention.

Figure 1:
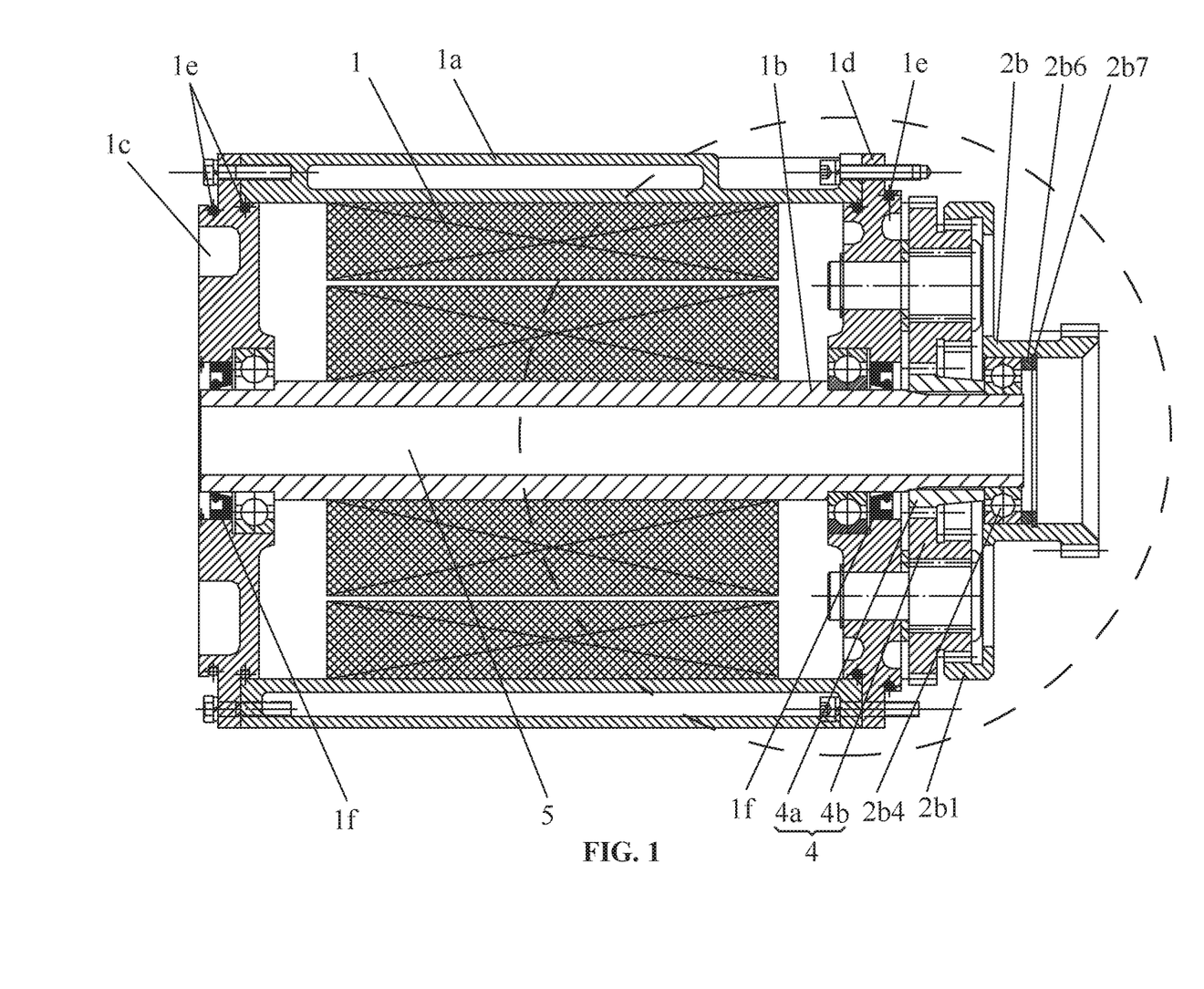
FIG. 1 is a schematic diagram of a coaxial output motor in accordance with one embodiment of the invention.
Figure 5:
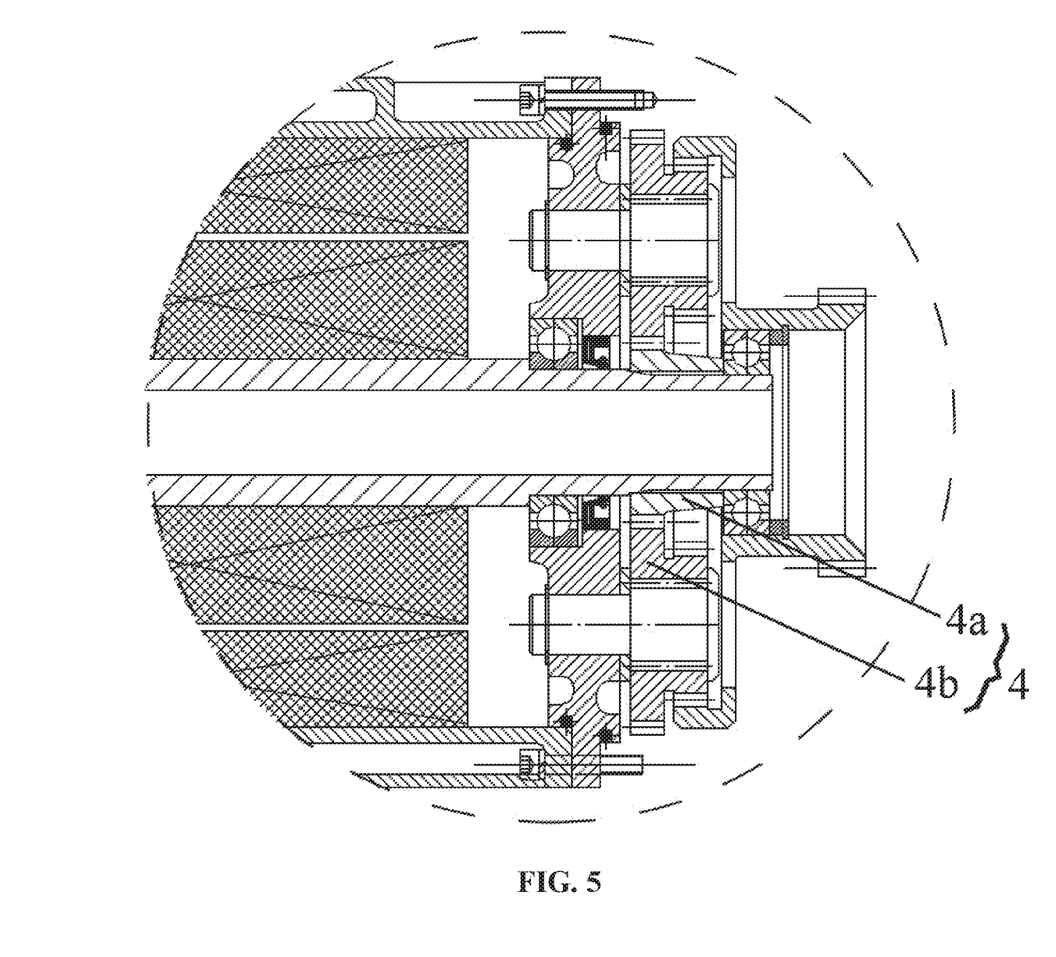
FIG. 5 is an enlarged view of the portion enclosed by dashed line in FIG. 1 which shows a transmission mechanism consisting of an input gear and a countershaft gear in the coaxial output motor.

A coaxial output motor comprises a motor subassembly 1, a transmission mechanism 4, and a gear shift mechanism 2b. The motor subassembly 1 comprises a motor housing 1a, a rear cover 1c disposed on one end of the motor housing 1a, a front cover 1d disposed on another end of the motor housing 1a, and a rotor shaft 1b movably disposed on the rear cover 1c and the front cover 1d. The rotor shaft 1b is a hollow structure. The transmission mechanism 4 comprises an input gear 4a fixedly disposed on a front end of the rotor shaft 1b and a first countershaft gear 4b movably disposed on the front cover 1d. The gear shift mechanism 2b comprises a first speed change gear 2b1. The first speed change gear 2b1 is movably disposed on the front end of the rotor shaft 1b. The input gear 4a is connected to the first speed change gear 2b1 via the first countershaft gear 4b. Because the rotor shaft 1b is a hollow structure, on the one hand, power of the motor subassembly 1 is output from one end of the rotor shaft 1b; on the other hand, power of the motor subassembly 1 is output from another end of the rotor shaft 1b via a transmission shaft disposed inside the rotor shaft. The power outputs become smoother, and are on the same axial line. Meanwhile, the transmission mechanism 4 and the gear shift mechanism 2b are integrated on the front cover 1d, thus the motor features compact structure, and the size of the whole drive assembly is thereby reduced.

Optionally, the gear shift mechanism 2b is a speed change structure capable of shifting two or three gears.

The first speed change gear 2b1 is an internal-external dual gear structure. One end of the first speed change gear 2b1 is movably disposed on the front end of the rotor shaft 1b. The input gear 4a is connected to a ring gear of the first speed change gear 2b1 via the first countershaft gear 4b. The first speed change gear 2b1 is disposed on the front end of the rotor shaft 1b via a coaxial locating bearing 2b4.

One side surface of the coaxial locating bearing 2b4 closely contacts an end surface of the input gear 4a. Another side surface of the coaxial locating bearing 2b4 is provided with a spacer sleeve 2b6 and a retaining ring 2b7. The retaining ring 2b7 is disposed in a shaft hole of the first speed change gear 2b1. The spacer sleeve 2b6 is disposed on one side of the retaining ring 2b7.

The first countershaft gear 4b is at least one in number. The first countershaft gear 4b is a dual gear structure. One end of the first countershaft gear 4b is constantly meshed with the input gear 4a, and another end of the first countershaft gear 4b is constantly meshed with the first speed change gear 2b1.

Internal and external connecting surfaces of the rear cover 1c and the front cover 1d are respectively provided with spigots 1e, and static seal assemblies are arranged inside the spigots. A joint of the rotor shaft 1b and the rear cover 1c, and a joint of the rotor shaft 1b and the front cover 1d are provided with rotary seal assemblies 1f, respectively.

Figure 2:
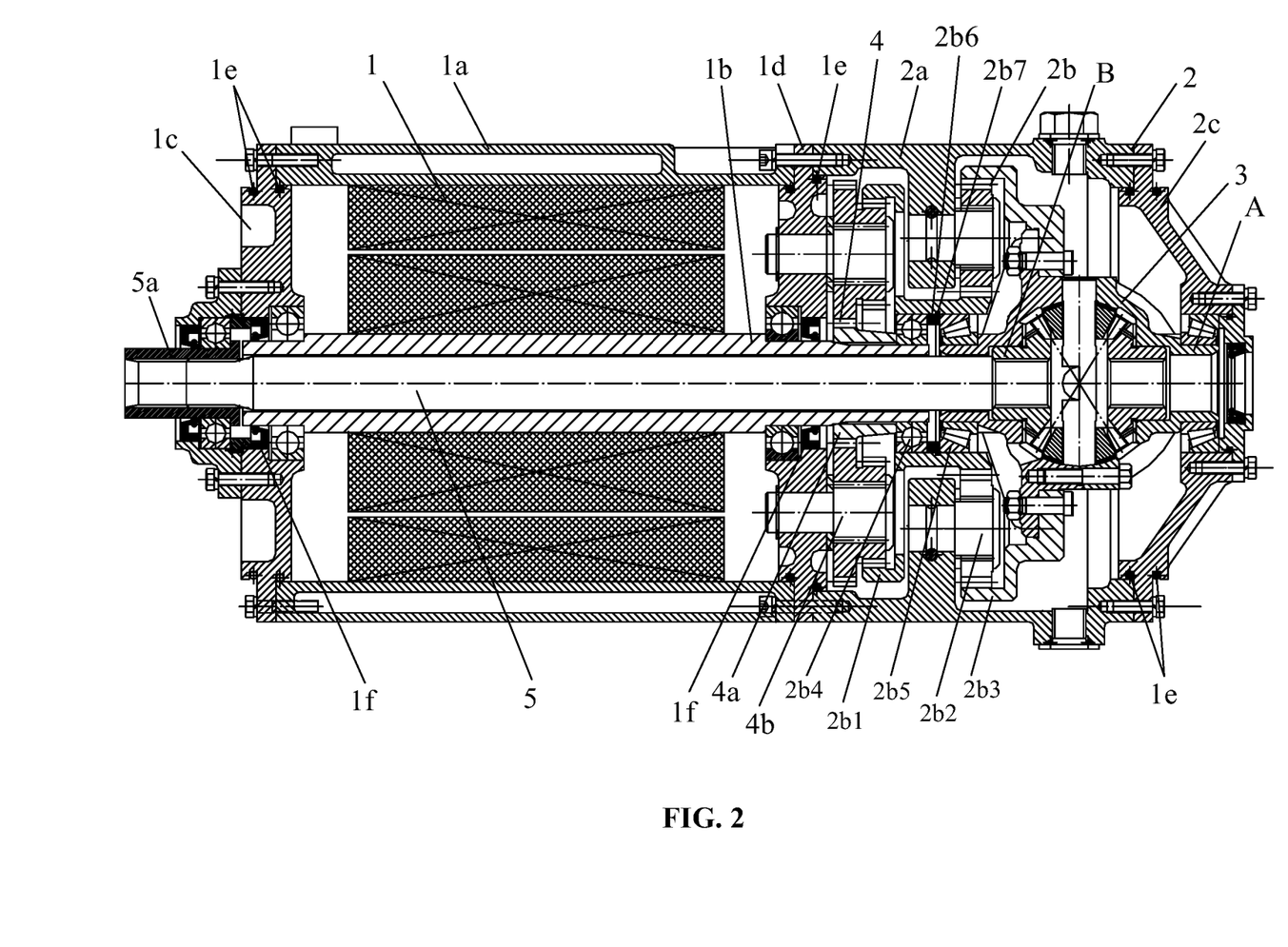
FIG. 2 is a schematic diagram of a drive assembly in accordance with one embodiment of the invention.

The motor is integrated with other components (such as differential subassembly 3) as a drive assembly which is adapted to coaxially output from two ends. The drive assembly comprises: a motor subassembly 1, a torque converter subassembly 2, and a differential subassembly 3. The motor subassembly 1 comprises a motor housing 1a, a rear cover 1c disposed on one end of the motor housing 1a, a front cover 1d disposed on another end of the motor housing 1a, and a rotor shaft 1b movably disposed on the rear cover 1c and the front cover 1d. The rotor shaft 1b is a hollow structure. The torque converter subassembly 2 comprises a torque converter housing 2a, a gear shift mechanism 2b disposed inside the torque converter housing 2a, and a torque converter cover 2c disposed on a front end of the torque converter housing 2a. A rear end of the torque converter housing 2a is disposed on the front cover 1d. The differential subassembly 3 is disposed at the inner side of the torque converter housing 2a. The front end of the rotor shaft 1b is connected to an input end of the gear shift mechanism 2b via the transmission mechanism 4. An output end of the gear shift mechanism 2b is fixed on a housing of the differential subassembly 3. An output end B of the differential subassembly 3 is disposed on the torque converter cover 2c. The output end A and the output end B of the differential subassembly 3 are coaxially arranged with the rotor shaft 1b. Power from the motor subassembly 1 passes through the rotor shaft 1b, and after speed change and torque change by the gear shift mechanism 2b, the power is transmitted to the differential subassembly 3; on the one hand, the power is directly output from the output end B of the differential subassembly 3, on the other hand, the power is output from the output end A of the differential subassembly 3, or, the power is output from a rear end of the motor subassembly 1 when a transmission shaft is disposed in the hollow rotor shaft 1b and is connected to the output end A of the differential subassembly 3. Because the output end A and the output end B of the differential subassembly 3 are coaxially arranged, the power outputs from the output end B and the power outputs from the rear end of the motor subassembly 1 are on the same axial line, thus the power of the motor subassembly 1 is able to be output coaxially from two ends of the subassembly, and the motor is well-balanced. Meanwhile, the gear shift mechanism 2b and the differential subassembly 3 are integrated in the torque converter housing 2a and are disposed on the front cover 1d, thus the motor features compact structure, and low space occupation in the chassis.

Specifically, the transmission mechanism 4 comprises the input gear 4a fixedly disposed on the front end of the rotor shaft 1b and the first countershaft gear 4b movably disposed on the front cover 1d. The gear shift mechanism 2b comprises the first speed change gear 2b1, a second countershaft gear 2b2 movably disposed on the torque converter housing 2a, and a second speed change gear 2b3. Specifically, the second countershaft gear 2b2 is disposed on the torque converter housing 2a via a cylindrical locating pin. The first speed change gear 2b1 is an internal-external dual gear structure. The second speed change gear 2b3 is an internal gear disc-shaped structure. One end of the first speed change gear 2b1 is movably disposed on the front end of the rotor shaft 1b, and another end of the first speed change gear 2b1 is movably disposed on the output end A of the differential subassembly 3. The side disc part of the second speed change gear 2b3 is fixedly disposed on the shell body of the differential subassembly 3 via a bolt. The differential subassembly 3 is disposed at the inner side of the torque converter housing 2a via the second speed change gear 2b3 and the torque converter cover 2c. The input gear 4a is connected to the ring gear of the first speed change gear 2b1 via the first countershaft gear 4b. An outer ring gear of the first speed change gear 2b1 is connected to the second speed change gear 2b3 via the second countershaft gear 2b2. Optionally, the gear shift mechanism 2b adopts a speed change structure capable of shifting one or three gear(s), and the speed change and the torque change are determined as needed.

More specifically, one end of the first speed change gear 2b1 is disposed on the front end of the rotor shaft 1b via a coaxial locating bearing 2b4, and the coaxial locating bearing 2b4 closely contacts an end surface of the input gear 4a. Another end of the first speed change gear 2b1 is disposed on the output end A of the differential subassembly 3 via the coaxial suspension bearing of differential 2b5, so that the shaft hole of the first speed change gear 2b1 is adapted to fix the output end A of the differential subassembly 3, and the output end A is ensured to be coaxial with the rotor shaft 1b.

Further, the spacer sleeve 2b6 and the retaining ring 2b7 are arranged between the coaxial locating bearing 2b4 and the coaxial suspension bearing of differential 2b5. The retaining ring 2b7 is disposed in the shaft hole of the first speed change gear 2b1. The spacer sleeve 2b6 is disposed on one side of the retaining ring 2b7. The spacer sleeve 2b6 and the retaining ring 2b7 are adapted to position the coaxial locating bearing 2b4 and the coaxial suspension bearing of differential 2b5, of course, other positioning mechanisms are optional.

Of course, the first countershaft gear 4b is at least one in number. The second countershaft gear 2b2 is at least one in number. The number of the first countershaft gear 4b and the number of the second countershaft gear 2b2 are determined by torque, speed, and force stationarity, etc.

Further, the first countershaft gear 4b is a dual gear structure. One end of the first countershaft gear 4b is constantly meshed with the input gear 4a, and another end of the first countershaft gear 4b is constantly meshed with the ring gear of the first speed change gear 2b1. The dual gear structure of the first countershaft gear 4b is adapted to improve the reduction ratio, bringing an improvement on the speed change and the torque change. Of course, a single gear structure is optional for the first countershaft gear 4b, and correspondingly, the dual gear structure is optional for the second countershaft gear 2b.

Further, a coaxial transmission shaft 5 is disposed at the inner side of the rotor shaft 1b and is coaxially arranged with the rotor shaft 1b. One end of the coaxial transmission shaft 5 is inserted in the output end A of the differential subassembly 3 via a first spline, and another end of the coaxial transmission shaft 5 is movably disposed on and outreaches from the rear cover 1c. The coaxially arranged coaxial transmission shaft 5 in the rotor shaft 1b enables the power on the output end A of the differential subassembly 3 to be output from the rear end of the motor subassembly 1, leading to a coaxial output from two ends of the motor subassembly 1, thus, the motor is well-balanced and able to transfer the power from the output end A of the differential subassembly 3 to the rear end of the motor subassembly without adding an extra transmission shaft. For the purpose of reducing an influence of an electromagnetic field of the motor subassembly 1 on a high-speed rotation of the coaxial transmission shaft 5, the coaxial transmission is made from magnetically permeable material.

Specifically, an extension of the coaxial transmission shaft 5 is sheathed with a transmission shaft sleeve 5a via a second spline, and the transmission shaft sleeve 5a is movably disposed on the rear cover 1c. Thus, the power is able to be directly output from the transmission shaft sleeve 5a without adding any power output mechanism.

Finally, internal and external connecting surfaces of the rear cover 1c, the front cover 1d, and the torque converter cover 2c are respectively provided with spigots 1e, and static seal assemblies are arranged inside the spigots 1e. Of course, other seal structures are optional. A joint of the rotor shaft 1b and the rear cover 1c, and a joint of the rotor shaft 1b and the front cover 1d are respectively provided with rotary seal assemblies if or other seal structures.

Power from the motor subassembly 1 passes through the rotor shaft 1b, and after speed change and torque change by the gear shift mechanism 2b, the power is transmitted to the differential subassembly 3; on the one hand, the power is directly output from the output end B of the differential subassembly 3, on the other hand, the power is output from the output end A of the differential subassembly 3, or, the power is output from a rear end of the motor subassembly 1 when a transmission shaft is disposed in the hollow rotor shaft 1b and is connected to the output end A of the differential subassembly 3. Because the output end A and the output end B of the differential subassembly 3 are coaxially arranged, the power outputs from the output end B and the power outputs from the rear end of the motor subassembly 1 are on the same axial line, thus the power of the motor subassembly 1 is able to be output coaxially from two ends of the subassembly, and the motor is well-balanced. Meanwhile, the gear shift mechanism 2b and the differential subassembly 3 are integrated in the torque converter housing 2a and disposed on the front cover 1d, thus the motor features compact structure, and low space occupation in the chassis. In addition, the shaft hole of the first speed change gear 2b1 is adapted to fix the output end A of the differential subassembly 3, so that the output end A is ensured to be coaxial with the rotor shaft 1b. Meanwhile, the first countershaft gear 4b and the second countershaft gear 2b2 are respectively three in number, and are equally arranged along a peripheral direction, enabling a smoother power transmission. Finally, the coaxially arranged coaxial transmission shaft 5 in the rotor shaft 1b enables the power on the output end A of the differential subassembly 3 to be output from the rear end of the motor subassembly 1, leading to a coaxial output from two ends of the motor subassembly 1, thus, the motor is well-balanced and able to transfer the power from the output end A of the differential subassembly 3 to the rear end of the motor subassembly without adding an extra transmission shaft.

The working process of the drive assembly is summarized as follows:

First, the power of the motor subassembly is transmitted through the rotor shaft 1b and the input gear 4a to the first countershaft gear 4b; then, the power is transmitted through the first speed change gear 2b1 to the second countershaft gear 2b2; after that, the power is transmitted through the second speed change gear 2b3 to the differential subassembly 3; at last, the power on the one hand is directly output from the output end B of the differential subassembly 3, on the other hand, the power is output from the output end A of the differential subassembly 3 via the coaxial transmission shaft 5.

Figure 3:
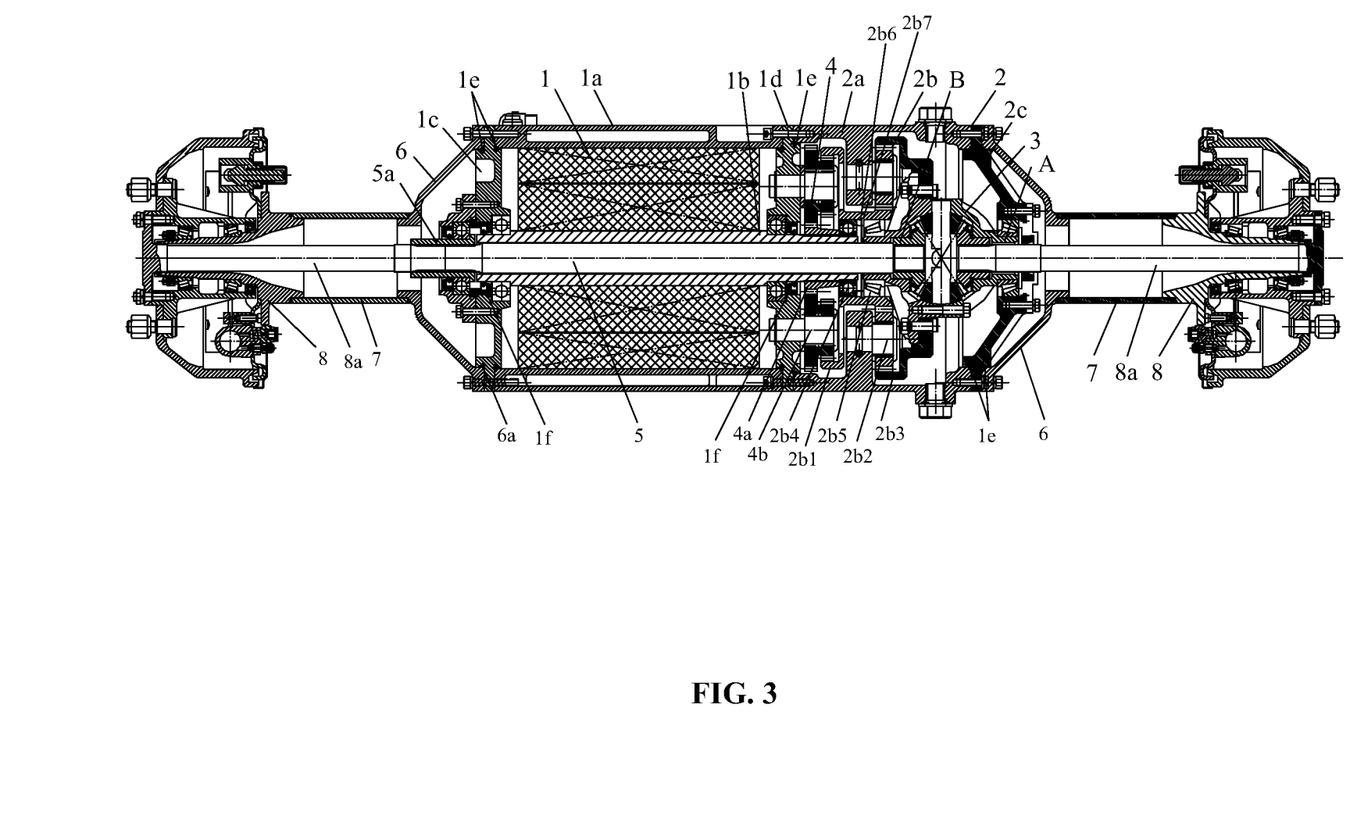
FIG. 3 is a schematic diagram showing a first assembly structure of a coaxial output motor in accordance with one embodiment of the invention.

The drive assembly in use coordinates with a combination of axle tube with external brake hub and external axle housing, or a combination of external brake hub and constant speed transmission shaft, so as to assemble a drive axle. Specific structures of the combination of axle tube with external brake hub and external axle housing, and a combination of external brake hub and constant speed transmission shaft are illustrated as follows:

The combination of axle tube with external brake hub and external axle housing comprises an external axle housing 6, an axle tube 7, and a hub subassembly of a first external brake 8 comprising an axle shaft 8a. A diameter of the axle tube 7 is corresponding to a diameter of a connection port of the hub subassembly of first external brake 8 comprising an axle shaft 8a. One end of the axle tube 7 is fixedly connected to the hub subassembly of first external brake 8, and another end of the axle tube 7 is fixedly connected to one end of the external axle housing 6; another end of the external axle housing 6 which is provided with an external spigot 6a meant for connection and installation is disposed on the rear cover 1c or/and the torque converter cover 2c.

The external axle housing 6 is a trumpet-shaped structure. The small end of the trumpet-shaped external axle housing 6 is soldered to the axle tube 7, and the big end of the trumpet-shaped external axle housing 6 is connected to the rear cover 1c or/and the torque converter cover 2c. The external spigot 6a is disposed on the big end of the trumpet-shaped external axle housing 6.

An assembly process of the combination of axle tube with external brake hub and external axle housing comprises: inserting the axle shaft 8a in the transmission shaft sleeve 5a, and positioning the external axle housing 6 on the rear cover 1c or/and the torque converter cover 2c via a bolt.

Figure 4:
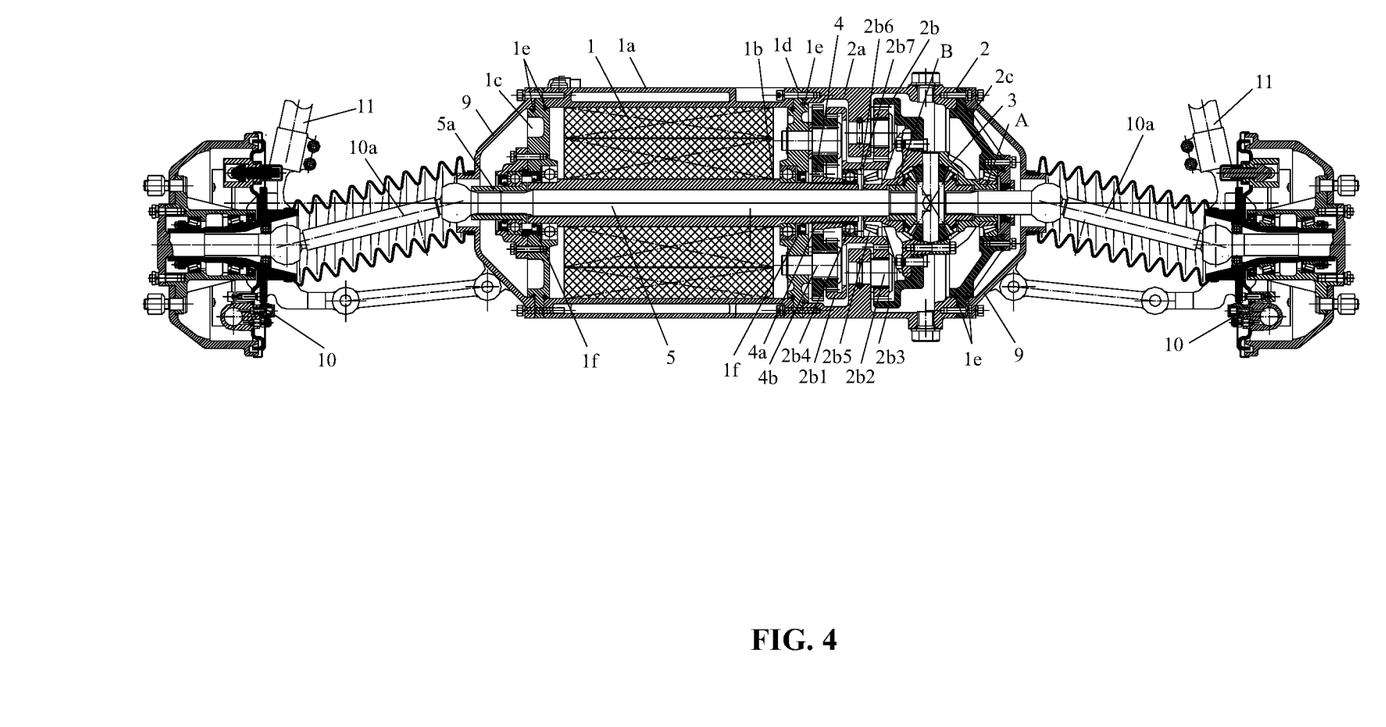
FIG. 4 is a schematic diagram showing a second assembly structure of a coaxial output motor in accordance with one embodiment of the invention.

The combination of external brake hub and constant speed transmission shaft comprises a protection shell of external transmission 9 and a hub subassembly of a second external brake 10 having a constant speed transmission shaft 10a. The dust cover positioned on a connection port of the hub subassembly of second external brake 10 is sleeved on one end of the protection shell of external transmission 9, and another end of the protection shell of external transmission 9 which is provided with the external spigot 6a meant for connection and installation is disposed on the rear cover 1c or/and the torque converter cover 2c.

The protection shell of external transmission 9 is a trumpet-shaped structure. The small end of the trumpet-shaped protection shell of external transmission 9 is connected to the hub subassembly of second external brake 10, and the big end of the trumpet-shaped protection shell of external transmission 9 is connected to the rear cover 1c or/and the torque converter cover 2c. The external spigot 6a is disposed on the big end of the trumpet-shaped external axle housing 6.

An assembly process of the combination of external brake hub and constant speed transmission shaft comprises: inserting the constant speed transmission shaft 10a in the transmission shaft sleeve 5a, and positioning the protection shell of external transmission 9 on the rear cover 1c or/and the torque converter cover 2c via a bolt. Of course, a suspension subassembly 11 is required to position the hub subassembly of second external brake 10.

Because the rotor shaft 1b is a hollow structure, on the one hand, power of the motor subassembly 1 is output from one end of the rotor shaft 1b; on the other hand, power of the motor subassembly 1 is output from another end of the rotor shaft 1b via a transmission shaft disposed inside the rotor shaft 1b. The power outputs become smoother, and are on the same axial line. Meanwhile, the transmission mechanism 4 and the gear shift mechanism 2b are integrated on the front cover 1d, thus the motor features good dynamic balance, compact structure, and low occupation rate, and, the motor is beneficial for the arrangement of chassis in a vehicle.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A coaxial output motor, comprising:
    a motor subassembly, the motor subassembly comprising a motor housing, a rear cover disposed on one end of the motor housing, a front cover disposed on another end of the motor housing, and a rotor shaft which is a hollow structure and rotatably disposed on the rear cover and the front cover;
    a transmission mechanism, the transmission mechanism consisting of an input gear fixedly disposed on the rotor shaft and a countershaft gear rotatably fixed on the front cover; and
    a gear shift mechanism, the gear shift mechanism consisting of a speed change gear rotatably fixed on a front end of the rotor shaft;
wherein:
    the countershaft gear is a double gear;
    the input gear is coaxial with the rotor shaft;
    the speed change gear is coaxial with the rotor shaft;
    one end of the double gear meshes with the input gear;
    another end of the double gear meshes with the speed change gear;
    when in use, rotation of the input gear is transmitted to the speed change gear via the countershaft gear;
    the speed change gear is disposed on the front end of the rotor shaft via a coaxial locating bearing; and
    one side surface of the coaxial locating bearing butts against an end surface of the input gear; another side surface of the coaxial locating bearing is provided with a spacer sleeve and a retaining ring; the retaining ring is disposed in a shaft hole of the speed change gear; and the spacer sleeve is disposed on one side of the retaining ring.

2. The motor of claim 1, wherein internal and external connecting surfaces of the rear cover and the front cover each are provided with spigots comprising built-in static seal assemblies.

3. The motor of claim 1, wherein a joint of the rotor shaft and the rear cover, and a joint of the rotor shaft and the front cover are provided with rotary seal assemblies, respectively.

* * * * *